United States Patent [19]

Van Wingerden

[11] Patent Number: 4,628,631
[45] Date of Patent: * Dec. 16, 1986

[54] SPECIAL LOCKING CLIP WITH APPARATUS FOR CARRYING PLURAL PLANTS TO A WATERING STATION

[76] Inventor: Arie Van Wingerden, R.R. #1, Box 37A, Pipersville, Pa. 18947

[*] Notice: The portion of the term of this patent subsequent to Oct. 22, 2002 has been disclaimed.

[21] Appl. No.: 760,523

[22] Filed: Jul. 30, 1985

Related U.S. Application Data

[63] Continuation-in-part of Ser. No. 590,404, Mar. 16, 1984, Pat. No. 4,547,992.

[51] Int. Cl.$^4$ .............................................. A01G 9/00
[52] U.S. Cl. ........................................... 47/17; 47/65; 47/48.5
[58] Field of Search .................. 47/17, 1.1, 1.5, 1.7, 47/67, 65, 48.5, 40.5; 224/268; 141/140; 17/14; 198/678; 248/304, 340

[56] References Cited

U.S. PATENT DOCUMENTS 2,732,929  1/1956  Delaney .............................. 198/686
4,547,992 10/1985  Wingerden ............................ 47/17

Primary Examiner—Robert E. Bagwill
Assistant Examiner—Bradley M. Lewis
Attorney, Agent, or Firm—Caesar, Rivise, Bernstein, Cohen & Pokotilow, Ltd.

[57] ABSTRACT

Apparatus for carrying plants periodically to a watering station while ensuring that said plants are uniformly exposed to light. The apparatus includes at least one conveyor in the form of an endless cable disposed about a pair of spaced drums. One of the drums is driven by a motor to cause the cable to be circulated about the drums. The cable supports a plurality of plant hangers at spaced locations there along. Each hanger is arranged so that when a plant is suspended therefrom it is in a first orientation arranged to trip a sensor at the watering station to water the plant. The hanger is also arranged to automatically assume a second orientation when no plant is suspended therefrom. In the second orientation the hanger does not trip the sensor at the watering station. The cable is arranged to be driven at a slower speed during watering operations and at a higher speed during plant loading and unloading operations. By virtue of the movement of the conveyor through the greenhouse each plant is uniformly exposed to light reaching the conveyor.

The present invention also includes a special form of the hanger means having a locking clip, so that the hanger means will be positively held on the conveyor means.

4 Claims, 9 Drawing Figures

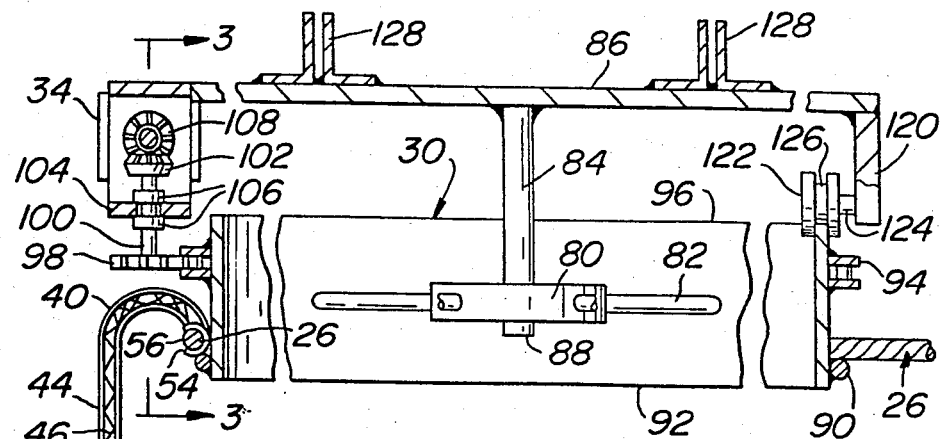
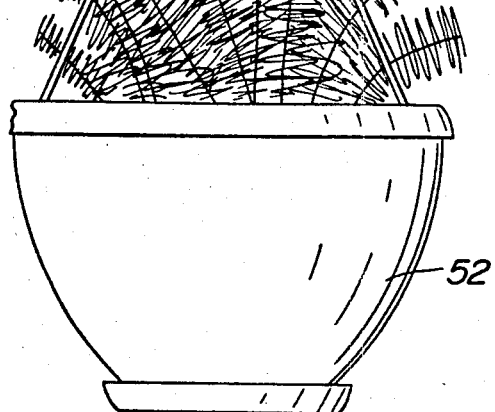
FIG. 2
FIG. 3

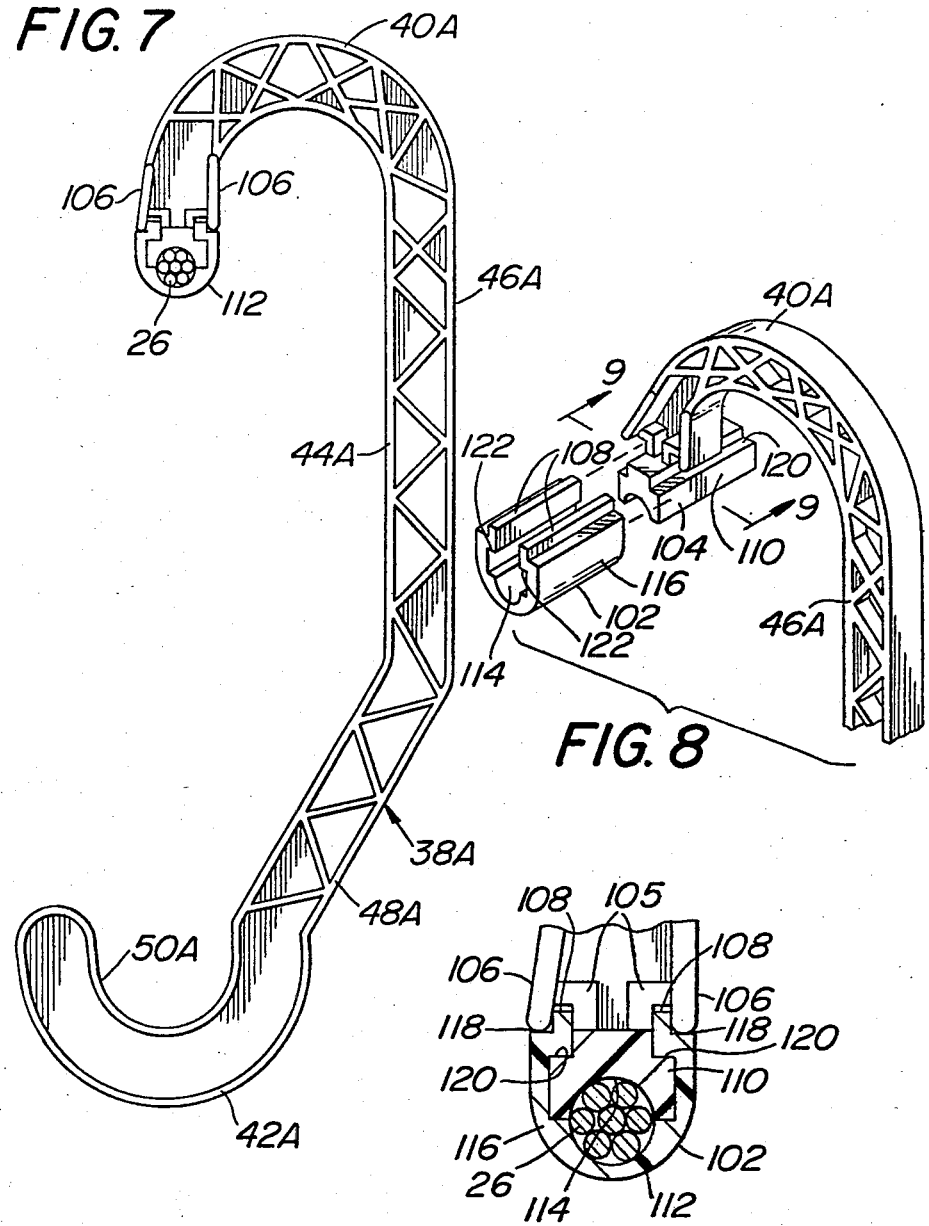

SPECIAL LOCKING CLIP WITH APPARATUS FOR CARRYING PLURAL PLANTS TO A WATERING STATION

SPECIFICATION RELATED APPLICATIONS p

This application is a continuation-in-part of U.S. application Ser. No. 590,404, filed Mar. 16, 1984, allowed U.S. Pat. No. 4,547,992, and entitled Apparatus for Carrying Plural Plans to a Watering Station.

BACKGROUND OF THE INVENTION

This invention relates generally to a special locking clip which can be associated with conveying apparatus and more particularly to apparatus for conveying plants through a greenhouse for effecting watering and even illumination thereof.

The growth of house plants on a mass basis in a greenhouse is normally accomplished by growing each plant in an individual pot or container. The pots or containers are commonly packed as closely together as possible on a tabletop or horizontal surface in order to conserve space. Periodic watering of the plants is commonly accomplished manually by having greenhouse personnel move from plant to plant in accordance with the prescribed schedule, with water being applied from a hose or other spray device connected to a reservoir or other water source. Alternatively, dripper lines, overhead spray devices, or perforated hoses can be used to spray the plants on a mass basis. While the latter arrangements can be accomplished quicker than manual watering, the use of such means does not result in the precise uniform watering of the plants. Moreover, these techniques also have other disadvantages, namely water wastage and wetting of surrounding areas.

Furtherstill, the storage of plants in a greenhouse at fixed locations on the table or horizontal surface for watering and growing results in a varying exposure of light to the plants, depending upon the location of the plants as well as any changes in natural light which may or may not be augmented by artifical light. Such action frequently results in uneven growth or maturation an obviously undesirable effect for commercial enterprises.

OBJECTS OF THE INVENTION

Accordingly, it is the general object of the instant invention to provide apparatus which overcomes the disadvantages of prior art methods in the apparatus for growing plants on a commercial basis.

It is another object of the instant invention to provide a conveyor system for plants for effecting the automatic watering thereof.

It is a further object of the instant invention to provide a conveyor system for plants for insuring that the plants receive uniform illumination.

It is still a further object of the instant invention to provide a conveyor system for plants which have been arranged for automatic low speed operation to effect the watering thereof and higher speed operation to effect the loading and unloading thereof.

Yet another object of the invention is to provide a special locking clip which can be used with the conveyor system of the invention. This locking clip in one of at least two forms is designated hanger means that can assume either a first orientation or a second orientation with respect to the conveyor means. Each hanger means is arranged to support a plant thereon, with each of the hanger means being held in the first orientation when the plant is supported thereon and being in the second orientation when the plant is not supported thereon. Sensing means are located at the watering station for co-acting with the hanger means when the hanger means is in the first orientation to actuate the watering means. On the other hand, when there is no plant being supported on the hanger means, the hanger means will be in a second orientation which will not actuate the watering means.

SUMMARY OF THE INVENTION

These and other objects of the instant invention are achieved by providing apparatus for carrying plural plants to a watering station. The apparatus comprises an endless loop conveyor means and support means therefor. Drive means are provided for causing the conveyor means to be circulated to the watering station. Plural hanger means are mounted at spaced locations on the conveyor means for movement therewith. Each of the hanger means is arranged to assume either a first orientation or a second orientation with respect to the conveyor means. Each of the hanger means is arranged to support a plant thereon, with the hanger means being in the first orientation when a plant is supported thereon and in the second orientation when a plant is not supported thereon. Sensing means are provided located at the watering station for coacting with the hanger means when the hanger means is in the second orientation. In this position the sensing means causes watering means located at the watering station to water the plant.

The present invention also includes a special form of the hanger means having a locking clip, so that the hanger means will be positively held on the conveyor means.

Other objects and many of the attendant advantages of the instant invention will be readily appreciated as the same becomes better understood by reference to the following detailed description when considered in connection with the accompanying drawing wherein:

DESCRIPTION OF THE DRAWING

FIG. 2 is an enlarged sectional view taken along line 2—2 of FIG. 1;

FIG. 3 is a sectional view taken along line 3—3 of FIG. 2;

FIG. 7 is an enlarged view showing a modified hanger with the present invention;

FIG. 8 is an enlarged three dimensional view showing the association of a locking clip with the hanger means; and FIG. 9 is an enlarged sectional view taken along the lines of 9—9 of FIG. 8.

DETAILED DESCRIPTION OF PREFERRED EMBODIMENT

Figure 1:
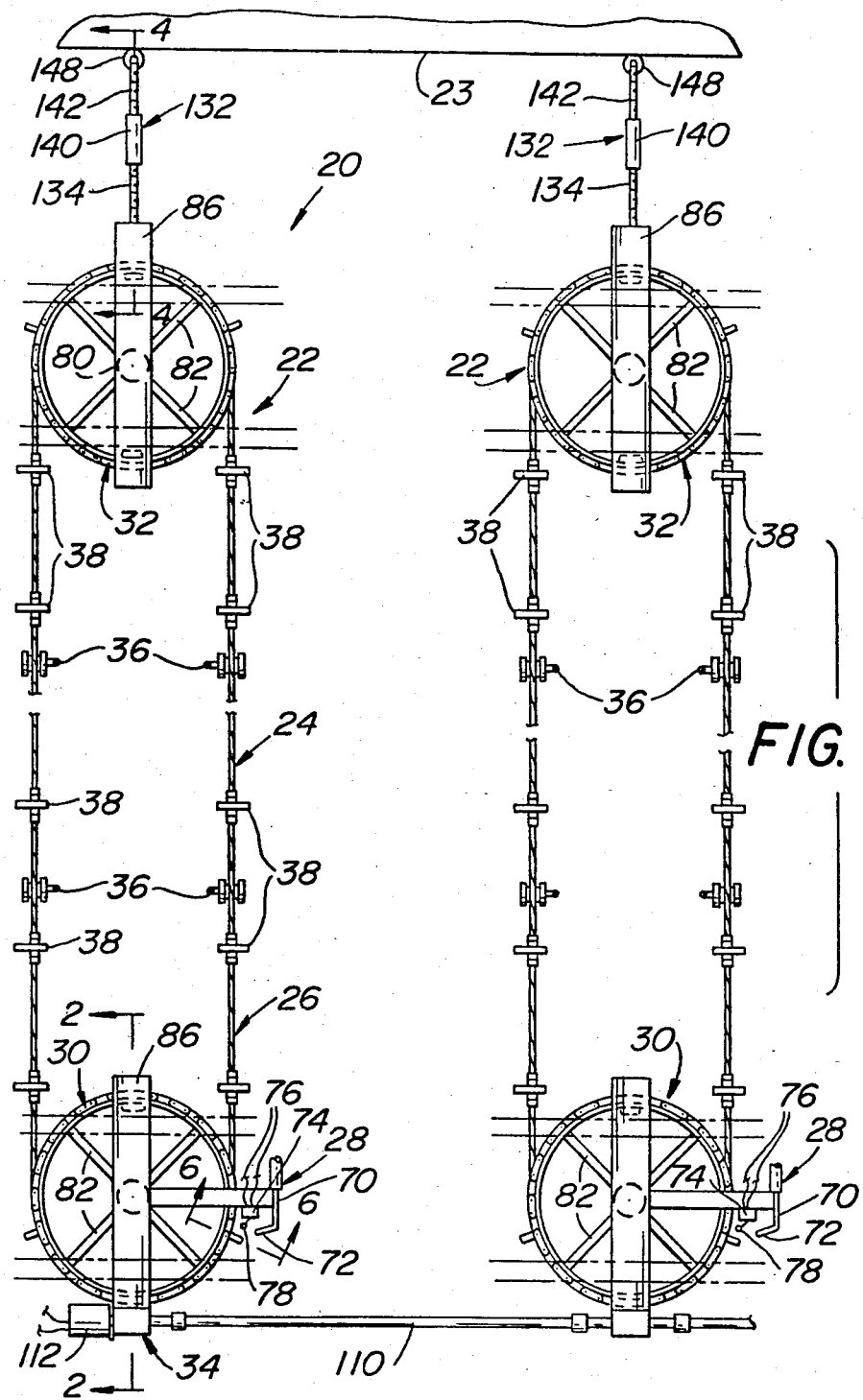
FIG. 1 is a plan view of a portion of a plant conveying system for disposition in a greenhouse and including plural plant conveying apparatus constructed in accordance with the instant invention.

Referring now in greater detail to the various figures of the drawing wherein like reference characters refer to like parts, there is shown at 20 in FIG. 1 a plant watering conveyor system constructed in accordance with the instant invention. The system basically comprises a plurality of plant conveying apparatus 22 each of which is arranged to be mounted within a building, such as a conventional commercial greenhouse, only one wall of which 23 is shown. The greenhouse includes at least one roof portion (not shown) through which light passes to reach at least a portion of each apparatus 22 of the system. Each of the apparatus 22 is constructed in an identical manner and basically includes a conveyor loop 24 on which plural plant hangers (to be described later) are mounted at equally spaced locations. Hence only a single conveyor apparatus will be described hereinafter. The means for driving the plural conveyor apparatus comprises a common electric motor and associated drive assembly which is common to all of the conveyor apparatus.

Each conveyor apparatus is arranged to carry plural plants 25 (FIG. 2) in a circulating loop past an associated watering station 28. The system is arranged so that each time a plant reaches the watering station it is automatically watered. Thus, the system 22 basically comprises the conveyor loop 24 which is preferably in the form of an endless steel cable 26 extending about a pair of cylindrical drums 30 and 32. The drums 30 and 32 are arranged to be spaced apart by a distance to accomodate any length greenhouse. The drum 30 is coupled to drive means 34 to effect the rotation of the drum. The drums 30 and 32 and the conveyor 24 are supported in horizontal orientation within the greenhouse at an elevated position. The means for supporting those components will be described later. The portion of the cable 26 spanning the two drums 30 and 32 is supported at intermediately spaced locations via plural support roller assemblies 36. Each cable 26 includes plural plant hangers 38 mounted thereon at equadistantly spaced locations.

Each of the hangers 38 is constructed so as to automatically assume one of two orientations depending on whether or not it is supporting a plant therefrom. In the first orientation, that is when it is supporting a plant, the hanger automatically assumes an orientation which cooperates with sensor means (to be described later) at the watering station 28 to automatically activate the watering means to water the plant when it reaches that station. When the hangers are in the second orientation, which they automatically assume when no plant is suspended therefrom, the hangers do not actuate the sensor so that no watering occurs when the empty hanger passes the watering station.

Figure 5:
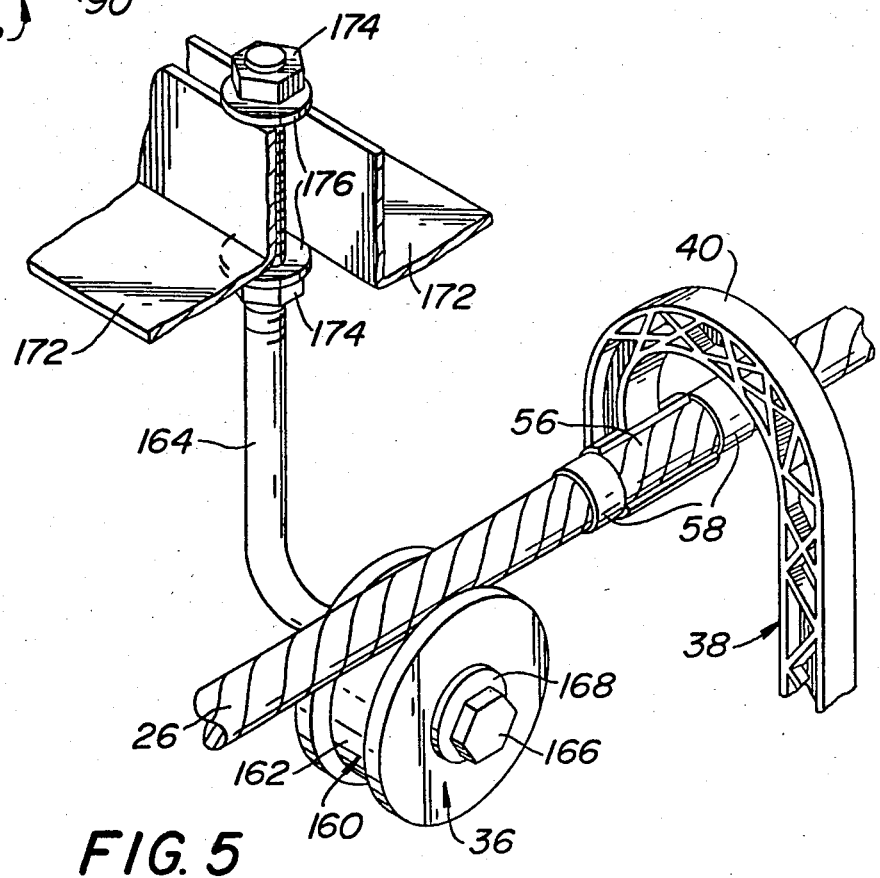
FIG. 5 is an enlarged perspective view of a portion of the cable support structure of the subject invention.

The details of a typical hanger 38 will now be considered and are best understood by reference to FIGS. 3 and 5. However, before describing the construction of hanger 38 a brief description of the cable 26 is in order. As can be seen cable 26 is of conventional construction, such as braided steel cable and is of circular profile. The cable 26 is in the form of an endless loop extending tightly about the two drums 30 and 32.

The hanger 38 is a generally assymetrical C-shaped member including an arcuate upper leg portion 40, an arcuate lower leg portion 42 and an intermediate portion 44. The intermediate portion is formed by a pair of arms 46 and 48 extending at an obtuse angle with respect to each other. The arcuate end portion 40 extends from the end of arm 46 while the arcuate end portion 42 extends from the end of arm 48. Arcuate portion 42 is curved upwards so that it forms a hook-like configuration for supporting the hook 50 of a conventional hanging basket 52 holding plant 25 therein. The arcuate portion 40 of the hanger 38 terminates in an arcuate recess 54 at the free end of portion 40. This recess serves as the means for mounting the hanger on the cable. To that end the cable is snap-fit into the recess through its open mouth 56. As can be seen the mouth 56 extends sufficiently about the periphery of the passageway 54 so that when the cable is located within the passageway the hanger can pivot with respect to the longitudinal axis of the cable without falling off the cable. In order to prevent the hanger from slipping longitudinally on the cable a pair of ring-like stops 58 are disposed on each side of the hanger at the pivoting connection (See FIG. 5).

As can be seen in FIG. 3 when a plant 26 is hung from hook portion 42 of the hanger 38 the weight on the hanger causes it to assume the first orientation wherein its arm portion 44 is disposed generally vertically and with the arcuate end portion 40 extending a substantial height above the elevation of the plane of the cable loop. It is in this first orientation that the portion 40 is arranged to contact a sensor mechanism (to be described later) to effect the watering operation. When the plant 26 is removed from the hanger 38 the natural twist of the cable causes it to rotate or pivot the hanger inward with respect to the longitudinal axis of the cable 26 to the second orientation and which is shown by phantom lines in FIG. 6. In this second orientation the upper arcuate arm portion 40 is disposed almost laterally of the cable 26 so as to avoid actuating the water initiating sensor or solenoid actuating arm 78.

Figure 6:
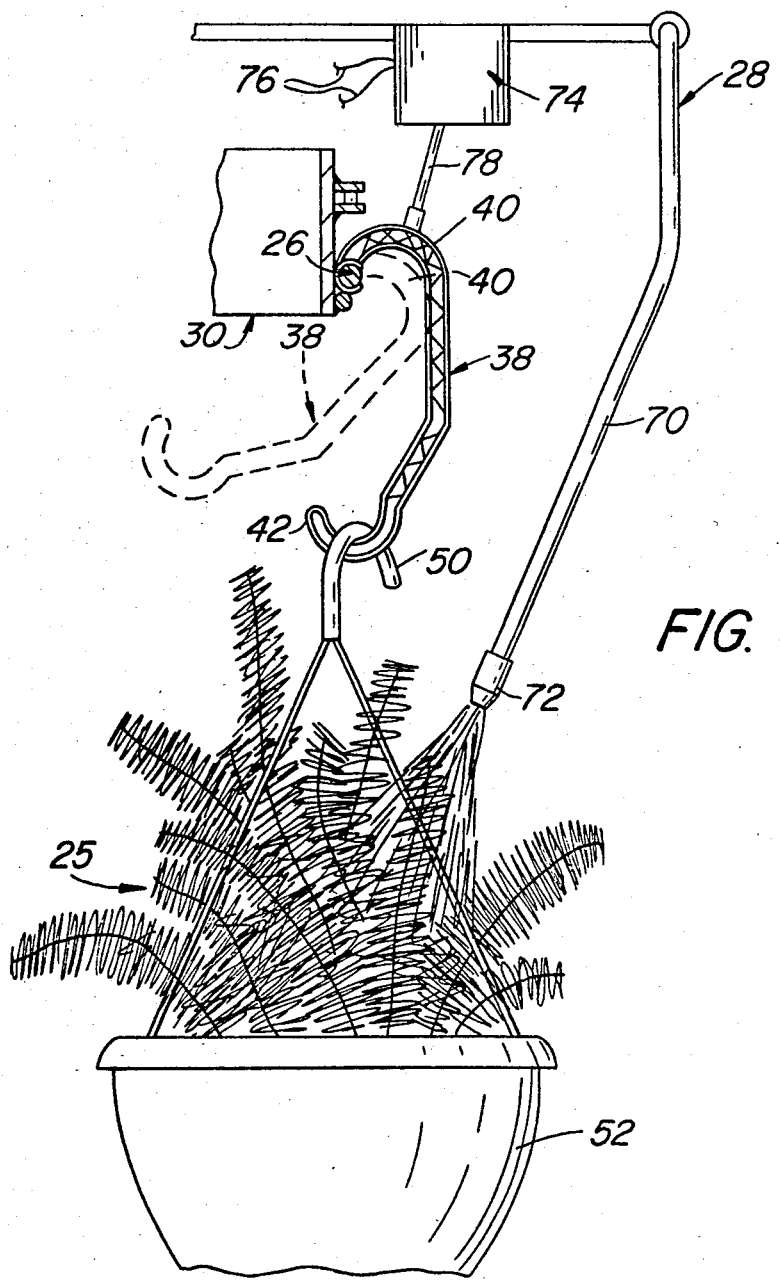
FIG. 6 is an enlarged sectional view taken along line 6—6 of FIG. 1.

Referring now to FIG. 6 it can be seen that each watering station consists of a watering conduit or spray tube 70 which is connected to a source of water supply (not shown). The free end of the spray tube 70 is in the form of a nozzle 72 directed at the position at which plant 25 will be located when carried by a hanger 38 to the watering station. Each watering station 28 also includes actuatable valve means 74 for controlling the flow of water through conduit 70 and out nozzle 72. The valve means 74 basically comprises an electrically operated solenoid valve of any suitable conventional type. The solenoid is connected in the electrical circuit of the system 20 via plural conductors 76. The actuation of the solenoid value to cause it to open is effected by the movement of its contactor arm 78. Thus, when contactor arm 78 is moved an associated relay in the solenoid valve 74 is actuated, whereupon water is enabled to flow from the water source through conduit 70 and out nozzle 72.

The actuator arm 78 of valve 74 is oriented so that it is located just slightly above the horizontal plane in which the cable loop 26 is located. Accordingly when a plant 25 is suspended from a hanger 38 so that the hanger is rotated to the position shown in FIG. 6 the arcuate portion 40 of the hanger 38 extends above the plane of the cable loop, whereupon when the hanger is carried to the watering station the actuator arm is tripped by hanger's arcuate portion 40. This action causes the solenoid valve to open, whereupon the plant 25 suspended from the hanger is sprayed with water. If the hanger 38 is empty (i.e. not carrying a plant) the hanger will be in the second orientation shown in phantom in FIG. 6. In this orientation the upper arcuate leg 40 of the hanger 38 is disposed almost laterally of the plane of the cable loop 26 and is hence below the free end of solenoid actuator arm 78. Accordingly, the actuator arm is not tripped, whereupon the solenoid valve 74 remains closed and no water is enabled to pass through conduit 70.

Referring now to FIGS. 1, 2, 3 and 4 the details of the two drums 30 and 32 will now be described. As can be seen drum 30 is the drive drum and basically comprises a wheelike tubular member having a central hub 80 from which project a plurality of radial spokes 82. Each spoke is secured to the inner periphery of the drum 30. A stationary vertical support shaft 84 is mounted vertically from a support plate or bracket 86. The hub 80 of the drum is mounted on the free end 88 of the support shaft and is held in place by means (not shown). The support shaft 84 thus serves as an axle for the drum 30 so that the drum 30 can rotate about the longitudinal axis of the shaft 84. A ring-like support ledge 90 extends about the periphery of the drum 30 adjacent its lower edge 92 and is welded in place. This support ledge serves as the means for supporting the cable 26 about the periphery of the drum so that the cable does not fall off. The drum 30 is arranged to be driven by the drive means 34. To that end the drum 30 includes a link chain 94 extending about its periphery adjacent its upper edge 96. The link-chain is welded in place and forms a set of gear teeth for engagement by gear means of the drive means (to be described hereinafter).

The gear means basically comprises a horizontally disposed spur gear 98 fixedly mounted on the lower end of a vertically disposed shaft 100. The upper end of shaft 100 includes a bevel gear 102. The shaft 100 is journaled in a motor mounting bracket 104 via a pair of bushings 106. The teeth of spur gear 98 are arranged to engage the links of chain 94 so that when shaft 100 is rotated the rotary action imparted to gear 98 is imparted to drum 30. The rotation of bevel gear 102 is effected via a cooperating bevel gear 108 which is mounted on a horizontally extending drive shaft 110. The shaft 110 comprises the rotary output shaft of the system's common motor 112. The motor 112 is a conventional electrical motor and mounted on the motor mount bracket 102. The drive shaft 110 being common to all of the plural conveyor apparatus of the system is an elongated member which is coupled to each conveyor apparatus 22. Thus, as can be seen in FIG. 1 the drive shaft 110 extends horizontally from the left most conveyor apparatus 22 to the next sucessive conveyor apparatus 22 and from there to the next sucessive conveyor apparatus and so forth. At each conveyor apparatus a bevel gear 108 is located on the shaft 110. This bevel gear cooperates with the other portions of the drive means located at that conveyor apparatus e.g., the bevel gear 102 and the other associated components, for effecting the rotation of drum 30 as just described heretofor.

In accordance with one aspect of this invention each conveyor apparatus is arranged to be driven at two different speeds. Thus when plants are loaded or unloaded from the conveyor the system is arranged to operate at a faster speed than it operates in moving the plants to and from the watering station.

The support plate 86 serves as the means for mounting the conveyor apparatus. In particular the motor housing 104 is mounted on plate 86. As can be seen in FIG. 2 the support plate includes a downwardly extending flange 120 from which a roller 122 projects radially inward on a journeled shaft 124. The roller 122 includes an annular recess 126 in its periphery adapted to receive the top edge 96 of the drum 30. This roller thus acts to hold the drum in position against the tension applied by the cable 26. The support plate 86 is mounted in the building via two pair of longitudinally extending angle brackets 128 welded to the top side of the support plate 86.

Figure 4:
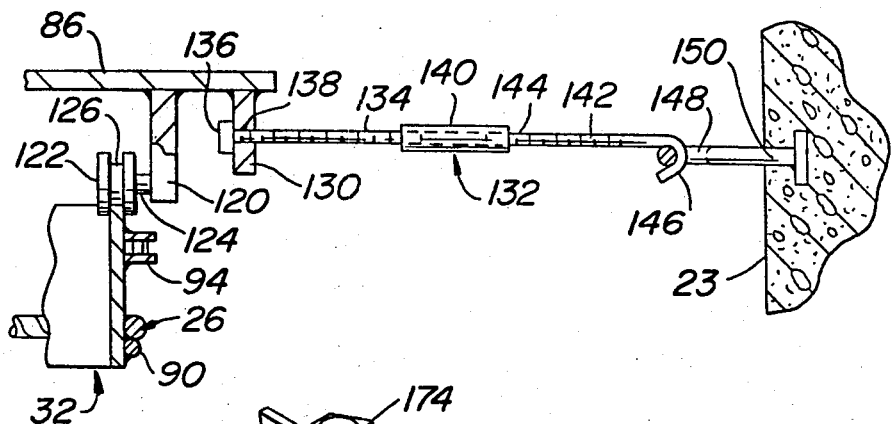
FIG. 4 is an enlarged sectional view taken along line 4—4 of FIG. 1.

The other or passive drum 32 is constructed in a basically similar manner to drum 30 and hence the common components are given the same reference numerals as drum 30. As can be seen in FIG. 4 the cable 26 also extends about the periphery of drum 32 and rests on its ring-like ledge 90. In order to keep the cable loop 26 taut the support plate 86 of the drum 32 also includes a downwardly extending flange 130 which receives one end of an adjustable turn buckle assembly 132. The turn buckle assembly 132 includes a threaded rod 134 terminating in a flanged end 136 and extending through an opening 138 in the support bracket flange 130. The other end of rod 134 extends into a threaded sleeve 140 of the turn buckle assembly. A second threaded rod 142 of the turn buckle assembly includes a threaded end 144 which is located in the opposite end of the sleeve 140. The free end of rod 142 is in the form of a hook 146. The hook 146 engages an eyelet 148 of a pin 150 anchored in the wall 23. Thus, as will be appreciated by those skilled in the art by the rotation of the sleeve 40 the rod portions 134 and 142 of the turn buckle assembly are brought closer together. This action applies tension to the cable via the support plate 86, the associated roller 122, and the drum 32.

Since the cable loop can extend for a substantial distance e.g., 100 feet or more, between the drums plural roller means 36 are utilized to support the cable between the drums. Referring now to FIG. 5, the details of a typical roller support means 36 will now be described. As can be seen the roller means 36 basically comprises a roller 160 having a peripheral groove 162 for supporting the cable 26 thereon. The roller 160 is mounted on a support rod 164. The support rod 164 includes a horizontally disposed free end on which the roller is located. The roller is held in place on the free end of the support rod via a bolt head 166 and an associated washer 168. The remaining portion of support rod 164 includes a vertically extending section terminating in a threaded end 170. The end portion 170 extends upward between the vertical flanges of a pair of right angle support bars 172. The support bars are mounted by means (not shown) to the building. The threaded portion 170 of the support rod extending between the flanges of members 172 is held in place via an opposed pair of nuts 174 and associated washers 176. Thus, by tightening the nuts 174 the support rod 164 is rigidly secured to the members 172, and hence to the building.

In accordance with the commercial embodiment of the instant invention the drums 30 and 34 are each 30 inches (76.2 centimeters) in diameter, the cable is ¼ inch (6.35 milimeters) in diameter and formed of galvanized steel and the motor is ¼ horsepower.

The motor is arranged to be operated at two speeds so that with the gear system as disclosed when it operates at the slower speed the cable circulates at approximately 30 feet (9.14 meters) per minute while at the fast speed the cable circulates at approximately 60 feet (18.28 meters) per minute.

Operation of the system as described heretofor is as follows. Plants are loaded and unloaded from each conveyor apparatus at either end thereof. During the loading and unloading of the apparatus drive is operated at the faster speed. As each hanger reaches an end where the loading or unloading is to occur the person at that end either hangs a plant on the hanger 38 or removes a plant from the hanger. When a plant is hung on the hanger 38 it causes the hanger to rotate from the phantom line position shown in FIG. 6 to a solid line position thereat. Each succeeding plant is suspended in the same manner. Conversly when plants are unloaded from the hangers each hanger pivots to the phantom line position shown in FIG. 6.

As each hanger suspending a plant therefrom reaches the watering station its arcuate portion 40 contacts the solenoid valve actuator arm 78. This action causes the solenoid valve to open and spraying to commence, whereupon the plant is watered. The watering action occurs without stoppage of the conveyor. It is of course to be understood by those skilled in the art, that if desired the conveyor can be automatically stopped when the solenoid valve actuator arm is tripped in order to provide greater watering time.

Alternatively, each solenoid valve may be constructed to include a built-in delay so that when the valve is opened it remains open for a predetermined period of time, irrespective of the position of the actuator arm. In such a case watering the plant can continue even slightly after the actuator arm moves out of contact with the arcuate portion 40 of the hanger 38.

As will be appreciated by those skilled in the art the apparatus of the instant invention applies two distinct advantages namely the automatic watering of plants suspended from hangers on the conveyor while also ensuring that each plant is exposed uniformly to light in the greenhouse by virtue of its movement therethrough. With uniform light exposure and effective precise watering the plants are more certain to mature essentially at the same time, thereby enhancing the ability of the commercial grower to fullfill commitments for delivery of mature plants as of a specified date.

Another form of the hanger 38 (identified as 38a) is shown in FIGS. 7, 8 and 9. In this form of the hanger, the arcuate recess 54 is replaced with a locking clip 102, which is slidably received on base 104 that extends from arcuate portion 40a. As shown in FIG. 8, the base 104 is integrally molded to arcuate portion 40a and more particularly connects with legs 105 extending from arcuate portion 40a (FIG. 9). As further shown in FIG. 9, the legs 105 are spaced from outer fingers 106 that also extend from arcuate portion 40a. A recess 108 existing between each pair of legs 105 and FIGS. 106 serves to received ledges 108 extending upwardly from the lock and clip 102.

Also integrally molded to the legs 105 is a lug 110 having an arcuate recess 112 that is comparable to arcuate recess 54 and open mouth 56 of hanger means 38a as shown in FIG. 6. However, the recess 112 is generally semi-circular and orientated in a completely downward sense or is open in a downward direction as shown in FIG. 9. Thus, when the locking clip 102 is slid into place, the complimentary recess 114 of the locking clip is associated with recess 112 of the lug 110 to form a generally circular opening through which the cable 26 passes. In this way, the hanger means 38a is positively, but releasably locked or held onto the cable 26. It is preferred that this locking of hanger means 38a on cable 26 be a generally loose attachment or holding so that the hanger can readily pivot with respect to the cable.

Also, where desired, ring-like stops at 58 (FIG. 5) can also be provided for use with hanger 38a, although in many cases the stops 58 will not be needed. This is because the lock and clip 102 can be so dimensioned with respect to the lug 110 that a relatively tight interfitting between the lock and clip 102 and the lug 110 is achieved. This tends to prevent lateral movement or sliding of the hanger means on the cable.

The lock and clip 102, basically comprises an outer wall 116, which terminates in shoulders 118 that are further defined by the ledges 108.

In view of the foregoing construction and with reference to FIG. 8, it can be seen that the lock and clip 102 can be easily slid upon the lug 110 so that the ledges 108 are received between legs 105 and outerfingers 106 of the base 104. Also, the shoulder 120 in the base 104 serves to receive and hold a complimentary inner shoulder 122 on the lock and clip 102. Thus the use of the locking clip form of the invention overcomes variations in cable diameter or changes in cable diameter occurring with changes in temperature.

It must be pointed out at this juncture while the invention has been discussed in terms of commercial growing of houseplants, it is of course to be recognized that this subject invention has application to growing of any type of vegetation which can be suspended from the hanger means of the system.

Without further elaboration the foregoing will so fully illustrate my invention that others may, by applying current or future knowledge, readily adapt the same for use under various conditions of service.

I claim:

1. Hanger means for use in connection with a cable, said hanger means comprising a generally assymetrical C-shaped member having upper and lower legs which are interconnected by an intermediate section, said upper leg having a passageway therein, said hanger means being arranged to assume either a first orientation or a second orientation, said hanger means being arranged to support a plant thereon, with said hanger means being in said first orientation when said plant is supported thereon and being configured to automatically assume said second orientation when a plant is not supported thereon, said upper leg being arranged to contact sensor means when said hanger is in said first orientation, said lower leg forming a hook for suspending a plant therefrom, said hanger means further including a locking means removably connecting said hanger means to a cable which passes through said upper leg passageway.

2. The hanger means of claim 1, wherein said locking means comprises a base extending from said upper leg, and a locking clip which is slidably received on said base to define said upper leg passageway.

3. The hanger means of claim 2, wherein said locking clip includes a complimentary recess which is associated with a recess in a lug to form said upper leg passageway, such that the hanger means is positively, but releasably locked onto the cable.

4. The hanger means of claim 1, including ring like stops positioned on said cable about said locking means to prevent lateral movement of the hanger means on the cable.

* * * * *